Figure 1:
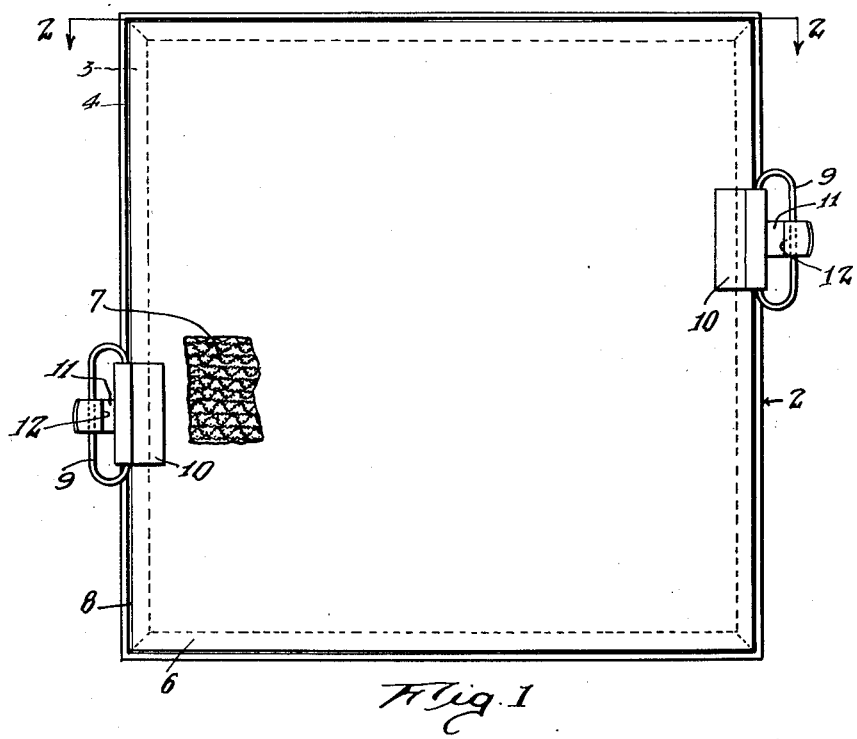

July 4, 1950 — M. N. FARR — 2,513,716
PANEL LATCH
Filed April 7, 1944

Inventor
Morrill N. Farr
By Lyon Lyon
Attorneys

Patented July 4, 1950

2,513,716

UNITED STATES PATENT OFFICE 2,513,716

PANEL LATCH

Morrill N. Farr, Los Angeles, Calif., assignor to Farr Company, Los Angeles, Calif., a corporation of California Application April 7, 1944, Serial No. 529,947

8 Claims. (Cl. 189—34)

This invention relates to a latch for latching two parts together such as a panel in a supporting frame, and it is particularly useful for latching an air filter panel unit into a supporting holder or frame. A general object of the present invention is to provide an improved structure for locking and holding an air filtering panel unit, or the like, in a mounting frame provided for holding such unit.

The structure or latch mechanism that I have provided is applicable, generally, to situations wherein two parts or devices are to be releasably secured together and where it is desirable that the parts be held dependably and against rattling and yet are easily and quickly releasable. I refer to the invention as used in securing a unit such as a filter pack in operating position in a frame or holder. However, it is to be understood that this is but one typical application of the invention and serves merely to illustrate a practical situation in which the invention may be used to advantage.

Air filters are commonly constructed with a polygonal or rectangular mounting frames to carry a plurality of filter packs or panel units. It is frequently necessary to remove one or more of the units from the frame, either for replacement or for cleaning. As the units and frame have been constructed this removal operation is performed only through considerable labor and difficulty.

It is a general object of the present invention to provide a construction whereby the installation of a filter unit, or the like, into a frame, or its removal from the frame, may be easily and quickly carried out. I provide a simple, easily operated, snap lock between a handle of the filter unit and the frame and by means of this lock the unit when installed is dependably held in the frame.

A further object of my invention is to provide a structure of the general character referred to wherein the mounted element is equipped with a convenient and readily accessible handle which is engaged by a part projecting from the frame and which forms a part of the retaining structure when the said element is retained in the frame.

Another object of the invention is to provide a structure of the general character referred to in which the handle on the mounted element is so related to the part that projects from the frame to cooperate with it that the operator can with one hand and by a simple, convenient manipulation operate the said part and grasp the handle.

Another object of the invention is to provide a structure of the general character referred to in which the handle on the mounted unit is a rigid pivotally mounted part acting under compression as the unit is held in the frame.

Another object of my invention is to provide a locking or retaining mechanism for a part such as a filter unit, or the like, whereby the unit is effectively held in pressure engagement with the supporting frame with a tendency for the pressure to increase rather than decrease as is the case with ordinary retaining devices.

A further object of the invention is to provide a spring actuated leverage device wherein there are but two simple parts, one a spring and the other a pivoted handle, which parts are so related that the spring is normally deflected somewhat from its normal position and is tending to return to its normal position and cooperates with the handle to develop an effective clamping action.

It is another object of my invention to provide a structure of the character referred to that is extremely simple and compact and which may be so applied as to a filter unit and its supporting frame as to in no way interfere with or cut down the effective capacity of the unit.

Figure 2:
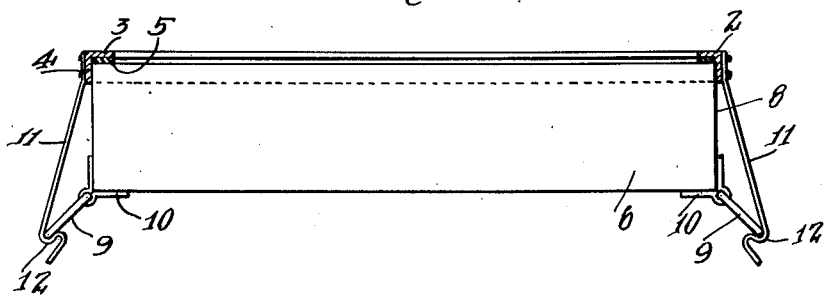

The present invention will be more fully understood from a description of a preferred form or example thereof and for that purpose I have hereinafter described a typical form and application of the invention and I make reference to the accompanying drawings in which:

Figure 1 is a front elevation of a structure including a frame and a filter unit held in the frame structure including my invention, a part only of the filter pack being shown in detail; and Figure 2 is a transverse sectional view taken on the line 2—2 of Fig. 1, showing the filter unit in elevation and parts of the frame and intervening seal or gasket in section.

Referring to the drawings, the structure to which the invention is applied or in which it is incorporated involves, generally, an air filtering unit and a mounting frame 2 conforming, generally, to the shape of the filter unit and which may, for example, be of rectangular form when the filter unit is so shaped. I have shown a simple rectangular frame formed of angle iron. One leg of the angle iron forming the frame 2 forms a base flange or seat 3 for the filtering unit hereafter described and prevents passage of the unit through the frame. The other leg 4 of the angle iron forms a side or guide flange for the filter unit and provides means for contacting and holding the unit in proper alignment in the frame. Packing material or a suitable gasket 5 may be provided on the base 3, if desired. The gasket serves as a seal and a limited cushion between the filter unit and the seat of the frame.

The air filtering panel or unit 6 is shown in operating position in the frame. It will be understood that any suitable air filtering unit may be employed in carrying out my invention. I have illustrated a unit of the type in which the air filtering element or pack is formed of a plurality of alternately flat and corrugated wire mesh members 7 mounted to lie parallel to the general direction of the intended air flow through the unit. It is to be understood, however, that the principles of the present invention may be applied to air filtering units of various constructions and may be applied to various devices or structures similar to those herein disclosed.

In the filter unit illustrated the wire mesh members forming the filtering pack are retained within a rectangular frame or holder 8. The sides or panel members of the holder establish the rectangular frame 8 as a rigid structure adapted to fit in the holding frame 2 so that it rests on the seat flange 3 and is confined by the guide flanges 4. The frame 2 as shown in the drawings forms a receptacle or socket to receive the frame of the filtering unit 6.

My invention provides a latch construction serving to releasably hold the filter unit 6 in the frame 2 with a clamping or pressure action keeping the unit tight against the frame. In practice one or more units involving my invention may be used to hold one part such as a filter unit and my construction may be applied to a filter unit, or the like, and its supporting frame in various manners depending upon working conditions or adjoining structures. In the case shown in the drawings I provide the clamp structures at opposite edges of the assembly of filter unit and frame in order to hold the filter unit 6 in the mounting frame 2.

Each clamp structure includes, generally, a handle or bail 9 and a spring arm 11. The handle 9 is preferably attached to the filter unit 6 at the outer end which is the end remote from that which engages the seat and it is preferably attached to the edge portion of the unit 6 as for instance to the edge of a panel member entering into the frame structure of unit 6. The handle 9 is shaped and proportioned to form a rigid convenient grip by which the unit 6 may be held or manipulated. In the drawings I show the handle as a flattened loop-shaped element and I show it pivotally joined to the unit 6 or to a frame structure of unit 6 by a suitable mounting bracket 10 which is suitably joined or fixed to the unit 6. The handle being in the form of a flattened loop has curved end portions and a straight outer or grip portion that extends parallel with the edge of unit 6 to which the handle is attached. The pivotal axis of the handle is, of course, parallel with the edge to which the handle is attached.

The spring arm 11 that cooperates with the pivoted handle is preferably rigidly or permanently joined to the frame 2 at or in line with the handle and projects outwardly from the frame to overlie the side of the filter unit 6 resting on the frame. The arm projects out past or beyond the outer end of the filter unit 6 and has a hook 12 at its outer end portion to receive and hold the handle. In the case illustrated the arm is a suitably flat or straight leaf spring and its outer end is shaped or bent to form a hook faced toward the edge portion of the unit 6 to which the handle is connected. The hook may have a tip or thumb extension projecting from its outer or end portion in position to be engaged by the thumb of a hand gripping handle 9.

In accordance with my invention the spring arm 11 and the handle 9 are shaped and related so that when the handle is engaged and held by the hook of the arm it projects from the outer end of the filter unit and somewhat from the side of the filter unit while the arm 11 is deflected outwardly so it extends toward the handle and somewhat out from the side of the filter unit to which the handle is attached. Pressure of the spring arm toward the side of the filter unit results in pressure of the filter unit onto the seat of the frame. This is the normal action of the structure and as it occurs the handle, which is rigid, operates under compression while the spring arm, except at the hook 12, operates under tension or longitudinal stress and is also subject to bending or lateral stress. The spring arm may be made strong or stiff and the difference in angle between the arm and handle slight so that the resulting force holding the unit 6 on its seat is great.

To release the holding structure the arm 11 may be deflected or flexed outward away from the side of the filter unit far enough to allow the handle to be disengaged from the hook. When two hook units are used and are at opposite edge portions of the structure, as shown in the drawings, the operator can conveniently hold the handle and manipulate or release the spring arms with his thumbs, by pressing on the outer end portions of the arms 11 that occur outward of the hook 12, thus releasing the filter unit 6 from the frame 2 without losing a sure and secure grip on the filter unit.

By means of the structure of the present invention, the filter unit 6 may be readily installed by use of the handles or bails 9—9 and on installation of the air filter unit panels into the mounting frame 3, it may be locked in operating position merely by snapping the spring arms 11 to the handles or bails 9, as indicated in Fig. 2 of the drawings. To remove the filter unit for replacement or repair or cleaning it is merely necessary to snap the spring arms 11 loose from the handles or bails 9 freeing the unit for handling independent of the frame 2.

While the particular form of the invention herein described is well adapted for carrying out the objects of the invention, various modifications and changes may be made without departing from the spirit of the invention, and this invention is of the scope set forth in the appended claims.

I claim:

1. In apparatus of the character described, a frame, a unit with its inner end seated on the frame, the frame having side walls confining the unit to the frame, a handle pivotally connected to the outer end portion of the unit, and a spring arm rigidly attached to the frame projecting outward therefrom beyond the outer end portion of the unit and having a hook portion releasably engaging and holding the handle with the arm and handle extending outwardly and laterally from the unit when the arm is deflected laterally away from the unit.

2. In apparatus of the character described, a frame, a unit seated on the frame and projecting outwardly therefrom, a handle pivoted to the projecting portion of the unit, and a spring arm rigidly attached to the frame and projecting outwardly therefrom past the unit and having a hook at its projecting end facing the unit and releasably engaging and holding the handle with the handle and arm extending outwardly and laterally relative to the unit when the arm is laterally deflected away from the unit.

3. Apparatus of the character described including, a polygonal frame with outwardly projecting side walls, a polygonal unit seated on the frame projecting outwardly beyond the side walls of the frame, a handle pivotally mounted at the outer edge portion of the unit, and a spring arm secured to the frame and extending outwardly therefrom at the side of the unit where the handle is mounted and having a snap hook outward of the unit receiving and holding the handle with the arm and handle pitched in the same direction and extending outwardly and laterally of the said side of the unit so pressure of the arm toward said side of the unit urges the unit toward the frame.

4. In combination two separable elements, one a frame and the other a unit seated on the frame, and a fastener between the elements including a rigid handle pivotally attached to one element and a spring arm rigid on the other element to project therefrom and having a normal unactuated position relative thereto and having a hook on its projecting portion engaging and holding the handle with the arm and handle angularly related, with the handle under compression, and with the arm flexed laterally from said unactuated position to be under tension and lateral strain, urging the unit toward the frame.

5. In combination two separable elements, one a frame and the other a unit seated on the frame, and a fastener between the elements including a rigid handle pivotally attached to one element and a spring arm rigidly fixed to the other element to project therefrom in a predetermined position relative to the frame and unit and having a hook on its projecting portion engageable with the handle to hold the handle with the arm and handle angularly related with the handle under compression when the arm is flexed laterally and is under tension holding the unit in pressure engagement with the frame, the handle being a flattened loop-shaped member with a substantially straight grip portion and the hook being engaged with said grip portion.

6. In combination, a frame having a seat, a unit supported by the seat and projecting outwardly therefrom, a handle pivotally carried by the unit projecting outwardly and laterally therefrom, and a spring arm rigidly secured to the frame to have an unactuated position where it projects outwardly beyond the unit adjacent the handle and having a hook releasably engaging and holding the handle when the arm is laterally deflected from said position to exert pressure toward the unit putting the arm under tension and the handle under compression with the unit urged toward the seat, the handle being a rigid flattened loop-shaped member with a substantially straight grip portion and the hook being engaged with said grip portion.

7. In combination, a frame, a unit detachable from the frame and normally seated thereon, handles pivotally attached to spaced edge portions of the unit, and spring arms fixedly attached to the frame to normally project in predetermined positions past the points at which the handles are mounted, the arms having hooks on their outer portions engaging and holding the handles with the arms and handles angularly related so pressure of the arms toward the unit puts the arms under tension and the handles under compression urging the unit toward the frame when the arms are flexed laterally, the arms having portions operable by parts of an operator's hands gripping the handles to disengage the hooks from the handles.

8. In combination, a frame, a unit detachable from the frame and normally seated thereon and projecting outwardly therefrom, handles pivotally attached to opposite outer edge portions of the unit, the handles being rigid, flattened, loop shaped elements and spring arms fixedly attached to the frame to project therefrom outwardly past the points at which the handles are mounted, the arms having hooks on their outer portions engaging and holding the handles with the arms and handles angularly related so pressure of the arms toward the unit put the arms under tension and the handles under compression urging the unit toward the frame when the arms are laterally flexed away from the unit.

MORRILL N. FARR.

REFERENCES CITED

The following references are of record in the file of this patent:

UNITED STATES PATENTS

| Number | Name | Date |
| --- | --- | --- |
| 165,044 | Weis | June 29, 1875 |
| 1,061,032 | Baker | May 6, 1913 |
| 1,420,892 | Thompson | June 27, 1922 |
| 1,548,644 | Wiley | Aug. 4, 1925 |
| 1,566,607 | Jordahl | Dec. 22, 1925 |
| 1,863,456 | Smith | June 14, 1932 |

FOREIGN PATENTS

| Number | Country | Date |
| --- | --- | --- |
| 37,816 | Sweden | of 1912 |